United States Patent [19]

Takeuchi et al.

[11] Patent Number: 4,803,125

[45] Date of Patent: Feb. 7, 1989

[54] MAGNETIC RECORDING MEDIUM

[75] Inventors: Yoji Takeuchi, Kyoto; Kenji Sumiya, Suita, both of Japan

[73] Assignee: Hitachi Maxell, Ltd., Osaka, Japan

[21] Appl. No.: 16,081

[22] Filed: Feb. 18, 1987

[30] Foreign Application Priority Data

Feb. 18, 1986 [JP] Japan .................................. 61-34890

[51] Int. Cl.$^4$ ................................................ G11B 5/72
[52] U.S. Cl. .................... 428/411.1; 427/128; 427/131; 427/132; 428/421; 428/422; 428/694; 428/695; 428/900; 428/704
[58] Field of Search ............... 428/695, 694, 422, 900, 428/421, 704, 411.1; 427/131, 128

[56] References Cited

U.S. PATENT DOCUMENTS

| | | | |
|---|---|---|---|
| 3,993,824 | 11/1976 | Shirahata | 428/900 |
| 4,268,556 | 5/1981 | Pedrotty | 428/65 |
| 4,309,482 | 1/1982 | Suzki | 428/900 |
| 4,419,406 | 12/1983 | Isobe | 428/422 |
| 4,505,990 | 3/1985 | Dasgupta | 428/900 |
| 4,536,444 | 8/1985 | Sumiya | 428/340 |
| 4,659,633 | 4/1987 | Yamaguchi | 428/695 |
| 4,692,378 | 9/1987 | Ishihara | 428/694 |
| 4,696,845 | 9/1987 | Yanagisawa | 428/900 |

FOREIGN PATENT DOCUMENTS

| | | | |
|---|---|---|---|
| 58-85930 | 5/1983 | Japan | 428/694 |
| 59-172154 | 9/1984 | Japan | 428/694 |
| 59-172155 | 9/1984 | Japan | 428/694 |
| 59-17157 | 9/1984 | Japan | 428/694 |
| 131632 | 7/1985 | Japan | 427/131 |
| 212809 | 10/1985 | Japan . | |

*Primary Examiner*—Ellis P. Robinson
*Attorney, Agent, or Firm*—Birch, Stewart, Kolasch & Birch

[57] ABSTRACT

A magnetic recording medium comprising a substrate, a magnetic layer formed on one surface of the substrate and a back coating layer formed on the other or back surface of the substrate, wherein the back coating layer contains at least one polyfluoropolyether having a polar group at least one molecular end and optionally at least one fluorine-containing solid lubricant, which has a small coefficient of friction and improved jitter characteristics, durability and corrosion resistance.

7 Claims, No Drawings

MAGNETIC RECORDING MEDIUM

BACKGROUND OF THE INVENTION

1. Field of the Invention

The present invention relates to a magnetic recording medium having a back coating layer formed on the back surface of a substrate opposite to a magnetic layer on the front surface of the substrate. More particularly, it relates to a magnetic recording medium having a back coating layer on the back surface of the substrate which contains a specific polyfluoropolyether and optionally a fluorine-containing solid lubricant.

2. Description of the Prior Art

Since a magnetic recording medium such as a magnetic tape comprises a substrate having smooth surfaces and a magnetic layer also has a smooth surface, it tends to closely contact guide rollers and the like during traveling and sticks to them. In case of a magnetic recording medium comprising a magnetic layer made by vacuum deposition of ferromagnetic metal or alloy on the substrate, since surface smoothness of the substrate is directly reflected on surface smoothness of the ferromagnetic metal thin layer and has a great influence on the electromagnetic conversion characteristics of the magnetic recording medium, an extremely smooth substrate should be used. For this reason, the substrate has a large coefficient of friction so that it easily sticks to the guide rollers, which results in elongation of the magnetic recording medium, stick slip or deterioration of the jitter characteristics.

To overcome these drawbacks, it has been proposed to provide a back coating layer containing a lubricant such as perfluoropolyether on a back surface of the substrate.

However, such a conventional back coating layer cannot sufficiently reduce the coefficient of friction of the substrate and in turn cannot improve the jitter characteristics and durability.

SUMMARY OF THE INVENTION

One object of the present invention is to provide a magnetic recording medium having a small coefficient of friction and better jitter characteristics.

Another object of the present invention is to provide a magnetic recording medium having an improved traveling property, durability and corrosion resistance.

These and other objects of the present invention are achieved by a magnetic recording medium comprising a substrate, a magnetic layer formed on one or front surface of the substrate and a back coating layer fomed on the reverse or back surface of the substrate, wherein the back coating layer contains a specific fluorinated polyether and optionally a fluorine-containing solid lubricant.

DETAILED DESCRIPTION OF THE INVENTION

According to one aspect of the present invention, there is provided a magnetio recording medium comprising a substrate, a magnetic layer formed on one surface of the substrate and a back coating layer formed on the other surface of the substrate, wherein the back coating layer contains at least one polyfluoropolyether selected from the group consisting of a fluorinated polyether which comprises repeating units of the formula:

$$-(C_mF_{2m}O)- \quad (I)$$

wherein m is an integer of 1 to 18 and has, at at least one molecular end, a polar group selected from the group consisting of polar groups of the formulae:

$$-COOR \quad (II)$$

$$-CONR_1R_2 \quad (III)$$

$$-C_nH_{2n}OH \quad (IV)$$

$$-C_nH_{2n}NR_1R_2 \quad (V)$$

$$-COC_nF_{2n+1} \quad (VI)$$

$$-C(OH)_2C_nF_{2n+1} \quad (VII)$$

and $$-CH_2OPO(OH)_2 \quad (VIII)$$

wherein R is a $C_1$–$C_6$ alkyl group or a benzyl or phenethyl group, $R_1$ and $R_2$ are the same and different and each a hydrogen atom, a $C_1$–$C_6$ alkyl group, a benzyl or phenethyl group or a group of the formula: $-R_3OH$ wherein $R_3$ is a $C_2$–$C_6$ alkyl group, and n is an integer of 1 to 10 and a fluorinated polyether which comprises the repeating units of the formula (I) and has, at both molecular ends, polar groups of the formula:

$$-COO-(CH_2CH_2O)_l-PO(OH)_2 \quad (IX)$$

wherein l is an integer of 1 to 90.

According to another aspect of the present invention, the back coating layer further contains at least one fluorine-containing solid lubricant selected from the group consisting of compounds of the formulae:

$$C_pF_{2p+1}(CH_2)_qOOC(CH_3)=CH_2 \quad (X)$$

$$C_pF_{2p+1}(CH_2)_qOOCCH=CH_2 \quad (XI)$$

$$C_pF_{2p}SO_2N(C_3H_7)C_2H_4OPO(OH)_2 \quad (XII)$$

$$C_pF_{2p+1}COOH \quad (XIII)$$

$$C_pF_{2p+1}(CH_2CH_2O)_rCOOH \quad (XIV)$$

$$C_pF_{2p+1}CH_2CH_2OH \quad (XV)$$

wherein p is an integer of 1 to 40, q is an integer of 1 to 50 and r is an integer of 1 to 50.

Since the polyfluoropolyether used according to the present invention has, at at least one molecular end, the polar group which has good affinity to a filler to be contained in the back coating layer and decreases surface tension of a back coating paint, surface smoothness of the layer is improved. In addition, since the backbone chain comprising the fluorinated polyether units has good lubricating effect and water- and oil-repellency, the presence of the polyfluoropolyether in the back coating layer decreases the coefficient of friction of the back surface of the magnetic recording medium having the magnetic layer on the surface so that the traveling property, jitter characteristics and durability of the magnetic recording medium are improved. ved. Since the polar group bonded to the molecular end of the polyfluoropolyether has good affinity to metals, when the magnetic tape comprising the magnetic layer of the ferromagnetic metal is wound and the back coating layer and the magnetic layer are contacted to each other, the polyfluoropolyether is transferred to the ferromagnetic metal layer so that the coefficient of friction of the metal layer is decreased. Further, due to the good lubricating function and water- and oil-repellency of the polyfluoropolyether, the corrosion resistance of the ferromagnetic metal layer is also improved. Therefore, the polyfluoropolyether greatly increases the traveling property and jitter characteristics as well as the durability and corrosion resistance of the magnetic tape comprising the magnetic layer of the ferromagnetic metal.

Preferred examples of the polyfluoropolyether are as follows:
(1) $HO-(CH_2)_2-NHCO-CF_2O-(CF_2CF_2O)_a-(CF_2O)_b-CF_2-CONH-(CH_2)_2-OH$,
(2) $(HOCH_2CH_2)_2-NCO-CF_2O-(CF_2CF_2O)_a-(CF_2O)_b-CF_2CON-(CH_2CH_2OH)$,
(3) $CH_3OCO-CF_2O-(CF_2CF_2O)_a-(CF_2O)_b-CF_2-COOCH_3$,
(3) $HOCH_2-CF_2O-(CF_2CF_2O)_a-(CF_2O)_b-CF_2-CH_2OH$,
(4) $CF_3O-[CF_2CF(CF_3)O]_b-CF_2-COCF_3$,
(5) $F-[CF(CF_3)CF_2O]_b-CF(CF_3)-COOCH_3$,
(6) $F-[CF(CF_3)CF_2O]_b-CF(CF_3)-CONH(CH_2)_2OH$,
(7) $CF_3-(OCF_2CF_2)_c-(OCF_2)_d-CF_2CH_2-OPO(OH)_2$,

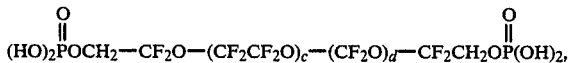
(8)

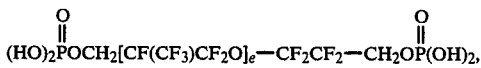
(9)

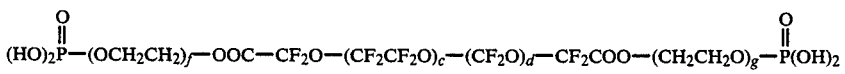
(10)

and

(11)

wherein a and b are the same or different and each an integer of 10 to 120, c, d and e are the same or different and each an integer of 10 to 50, and f and g are the same or different and each an integer of 1 to 50. These compounds may be used alone or as a mixture of at least two of them.

When a and/or b are smaller than 10, the coefficient of friction is not effectively decreased. When they are larger than 120, the polyfluoropolyether has high viscosity or is solid at room temperature, so that the coefficient of friction becomes too large. When c, d and/or e are too small, the coefficient of friction becomes too large. When c, d and e and/or f and g are larger than 50, the coefficient of friction also becomes too large.

The fluorine-containing solid lubricant has good compatibility with the polyfluoropolyether having the polar group at at least one molecular end. Therefore, when the fluorine-containing solid lubricant is combined with the polyfluoropolyether, the lubrication effect is enhanced by the solid-liquid two phase system, so that the traveling property, jitter characteristics, durability and corrosion resistance of the magnetic recording medium are further improved.

The fluorine-containing solid lubricant of the formulae (X) to (XV) can be used alone or as a mixture of at least two of them. In the formulae (X) to (XV), p is an integer of 1 to 40, 8 is an integer of 1 to 50, and r is an integer of 1 to 50. When p is larger than 40, synthesis of the compound is difficult. When 8 and/or r are larger than 50, the coefficient of friction becomes too large.

When the fluorine-containing solid compound is combined with the polyfluoropolyether, a weight ratio of the former to the latter is preferably in the range between 1:10 and 101.

An amount of the polyfluoropolyether contained in the back coating layer is from 0.01 to 10.0 % by weight, preferably from 0.1 to 4.0 % by weight based on the whole weight of the solid components contained in the back coating layer. When the amount of the polyfluoropolyether is smaller than 0.01 % by weight, the desired effects of the addition of the polyfluoropolyether are not achieved. When it is larger than 10.0 % by weight, the magnetic recording medium may stick to a magnetic head.

When the polyfluoropolyether and the fluorine-containing solid lubricant are combined, the total amount of these compounds is from 0.05 to 10.0 % by weight, preferably from 1.0 to 5.0 % by weight based on the whole weight of the solid components in the back coating layer. When the total amount of them is smaller than 0.05 % by weight, the desired effects are not achieved. When it is larger than 10.0 % by weight, the magnetic recording medium may stick to the magnetic head.

The back coating layer containing the polyfluoropolyether and optionally the fluorine-containing solid lubricant may be formed by preparing a back coating paint by mixing and dispersing the polyfluoropolyether and optionally the fluorine-containing lubricant in addition to conventional components such as the filler, a binder resin, an organic solvent and the like, applying the paint on the back surface of the substrate such as a polyester film on the surface of which the magnetic layer has been formed and drying the paint. Alternatively, after forming the back coating layer not containing the polyfluoropolyether, a solution containing the polyfluoropolyether dissolved in a solvent such as 1,1,2-trichloro-1,2,2-trifluoroethane can be applied on the back coating layer.

A thickness of the back coating layer is preferably from 0.1 to 3.0 μm, more preferably from 0.3 to 2.0 μm. When the thickness of the back coating layer is smaller han 0.1 μm, the desired effects are not achieved. When it is larger than 3.0 μm, the magnetic recording medium is curled with the back coating layer inside.

The filler to be contained in the back coating layer is preferably an inorganic one. Preferred examples of the inorganic filler are carbon black, $\alpha$-$Fe_2O_3$ powder, $Cr_2O_3$ powder, $Al_2O_3$ powder, $BaSO_4$ powder, $CaCO_3$ powder, MgO powder, $BaCO_3$ powder, ZnO powder, $Cu_2O$ powder, CuO powder, $MoS_2$ powder, $WS_2$ powder and the like. Usually, the filler has an average particle size of 0.05 to 5 $\mu$m in order to form minute unevenness on the surface of the back coating layer and to achieve smooth traveling of the magnetic recording medium. An amount of the filler contained in the back coating layer is from 20 to 80 % by weight based on the whole weight of the solid components in the back coating layer.

The binder resin is also a conventional one and its examples are vinyl chloride/vinyl acetate resin, polyvinylbutyral resin, cellulose resin, polyurethane resin and isocyanate compounds.

Specific examples of the organic solvent are methyl isobutyl ketone, methyl ethyl ketone, cyclohexanone, toluene, ethyl acetate, tetrahydrofuran, dimethyl formamide and the like and mixtures thereof.

The magnetic layer is formed on the surface of the substrate by a per se conventional method, for example, by applying a magnetic paint comprising conventional magnetic powder, a binder resin and anorganic solvent on the surface of the substrate and drying it, or by vacuum depositing, ion plating, spattering or plating ferromagnetic metal on the surface of the substrate. Specific examples of the magnetic powder are $\gamma$-$Fe_2O_3$ powder, $Fe_3O_4$ powder, cobalt-containing $\gamma$-$Fe_2O_3$ powder, cobalt-containing $Fe_3O_4$ powder, iron powder, cobalt powder, iron-nickel alloy powder, barium ferrite and the like. Specific examples of the ferromagnetic metal are cobalt, nickel, iron, cobalt-nickel alloy, cobalt-chromium alloy, cobalt-phosphorus alloy, cobalt-nickel-phosphorus alloy and the like.

PREFERRED EMBODIMENTS OF THE INVENTION

The present invention will be explained further in detail by following examples, wherein part(s) are by weight unless otherwise indicated.

EXAMPLES 1-12

On a surface of a polyester film having a thickness of 12 $\mu$m installed in a vacuum deposition device, cobalt was deposited by heating and evaporating cobalt under pressure of $5 \times 10^{-5}$ Torr. to form a ferromagnetic metal layer of cobalt having a thickness of 0.2 $\mu$m. Then, on the reverse surface of the polyester film, a back coating paint having the following composition was coated and dried to form a back coating layer with a thickness of 1.0 $\mu$m. The film was cut to a predetermined width to produce a magnetic tape:

| Component | Parts |
|---|---|
| Carbon black | 300 |
| Nitrocellulose | 100 |
| Polyurethane resin | 70 |
| Trifunctional isocyanate compound having a low molecular weight | 30 |
| Polyfluoropolyether having the polar group (hereinbelow described) | 3 |
| Cyclohexanone | 750 |
| Toluene | 750 |

EXAMPLE 13

In the same manner as in Example 1 but additionally using 3 parts of $CH_2=CHCOOCH_2CH_2C_{10}F_{21}$ as the solid lubricant and forming a back coating layer having a thickness of 1.0 $\mu$m, a magnetic tape was produced.

EXAMPLE 14

In the same manner as in Example 3 but additionally using 3 parts of $CH_2=C(CH_3)COOCH_2CH_2C_{10}F_{21}$ as the solid lubricant and forming a back coating layer having a thickness of 1.0 $\mu$m, a magnetic tape was produced.

EXAMPLE 15

In the same manner as in Example 5 but additionally using 3 parts of $CH_2=CHCOOCH_2CH_2C_{10}F_{21}$ as the solid lubricant and forming a back coating layer having a thickness of 1.0 $\mu$m, a magnetic tape was produced.

EXAMPLE 16

In the same manner as in Example 5 but additionally using 3 parts of $CH_2=C(CH_3)COOCH_2CH_2C_{10}F_{21}$ as the solid lubricant and forming a back coating layer having a thickness of 1.0 $\mu$m, a magnetic tape was produced.

EXAMPLE 17

In the same manner as in Example 1 but additionally using 3 parts of $CH_2=CHCOOCH_2CH_2C_8F_{17}$ as the solid lubricant and forming a back coating layer having a thickness of 1.0 $\mu$m, a magnetic tape was produced.

EXAMPLES 18-29

Following components were mixed and dispersed in a ball mill for 72 hours to prepare a magnetic paint:

| Component | Parts |
|---|---|
| Iron magnetic powder | 80 |
| Vinyl chloride/vinyl acetate/ vinyl alcohol copolymer (VAGH manufactured by U.C.C.) | 16 |
| Urethane prepolymer (Takenate L-1007 manufactured by Takeda Chemical) | 4 |
| Methyl isobutyl ketone | 61 |
| Toluene | 61 |

The magnetic paint was coated on a surface of a polyester film having a thickness of 12 $\mu$m and dried to form a magnetic layer having a thickness of 6 $\mu$m.

On the reverse surface of the film on the surface of which the magnetic layer had been formed, a back coating layer having a thickness of 1.0 $\mu$m was formed in the same manner as in Examples 1 to 12. The film was then cut to a predetermined width to produce a magnetic tape.

EXAMPLE 30

In the same manner as in Example 18 but additionally using 3 parts of $CH_2=CHCOOCH_2CH_2C_{10}F_{21}$ as the solid lubricant and forming a back coating layer having a thickness of 1.0 $\mu$m, a magnetic tape was produced.

EXAMPLE 31

In the same manner as in Example 20 but additionally using 3 parts of $CH_2=C(CH_3)COOCH_2CH_2C_{10}F_{21}$ as the solid lubricant and forming a back coating layer having a thickness of 1.0 $\mu$m, a magnetic tape was produced.

EXAMPLE 32

In the same manner as in Example 22 but additionally using 3 parts of $CH_2=CHCOOCH_2CH_2C_{10}F_{21}$ as the solid lubricant and forming a back coating layer having a thickness of 1.0 μm, a magnetic tape was produced.

EXAMPLE 33

In the same manner as in Example 22 but additionally using 3 parts of $CH_2=C(CH_3)COOCH_2CH_2C_{10}F_{21}$ as the solid lubricant and forming a back coating layer having a thickness of 1.0 μm, a magnetic tape was produced.

EXAMPLE 34

In the same manner as in Example 18 but additionally using 3 parts of $CH_2=CHCOOCH_2CH_2C_8F_{17}$ as the solid lubricant and forming a back coating layer having a thickness of 1.0 μm, a magnetic tape was produced.

COMPARATIVE EXAMPLES 1-3

In the same manner as in Example 1 but using a polyfluoropolyether not having a polar group as shown below and forming a back coating layer having a thickness of 1.0 μm, a magnetic tape was produced.

COMPARATIVE EXAMPLES 4-6

In the same manner as in Example 18 but using a polyfluoropolyether not having a polar group as described below and forming a back coating layer having a thickness of 1.0 μm, a magnetic tape was produced.

COMPARATIVE EXAMPLE 7

In the same manner as in Example 1 but using no polyfluoropolyether having the polar group, a magnetic tape was produced.

COMPARATIVE EXAMPLE 8

In the same manner as in Example 18 but using no polyfluoropolyether having the polar group, a magnetic tape was produced.

---

Polyfluoropolyether having the polar group

Examples 1 and 18

$$(HO)_2POCH_2CF_2O-(CF_2CF_2O)_c-(CF_2O)_d-CF_2CH_2OP(OH)_2$$
(with P=O double bonds)

A weight average molecular weight = 2,000  $C_2F_4O/CF_2O = 0.7 \pm 0.2$

Examples 2 and 19

$$(HO)_2POCH_2-[CF(CF_3)CF_2O]_e-CF_2CF_2-CH_2OP(OH)_2$$

A weight average molecular weight = 3,000

Examples 3 and 20

$$(HO)_2P-(OCH_2CH_2)_f-OOC-CF_2O-(CF_2CF_2O)_c-(CF_2O)_d-CF_2COO-(CH_2CH_2O)_g-P(OH)_2$$

A weight average molecular weight = 2,000  $C_2F_4O/CF_2O = 0.7 \pm 0.2$

Examples 4 and 21

$$(HO)_2P-(OCH_2CH_2)_f-OOC-[CF(CF_3)CF_2O]_e-COO-(CH_2CH_2O)_g-P(OH)_2$$

A weight average molecular weight = 3,000  $C_2F_4O/CF_2O = 0.7 \pm 0.2$

Examples 5 and 22

$$CF_3-(OCF_2CF_2)_c-(OCF_2)_d-CF_2CH_2-OP(OH)_2$$

A weight average molecular weight = 2,000  $C_2F_4O/CF_2O = 0.7 \pm 0.2$

Examples 6 and 23

$HO-(CH_2)_2-NHCO-CF_2O-(CF_2CF_2O)_a-(CF_2O)_b-CF_2-CONH-(CH_2)_2-OH$
A weight average molecular weight = 2,000  $C_2F_4O/CF_2O = 0.7 \pm 0.2$ Examples 7 and 24

$(HOCH_2CH_2)_2-NCO-CF_2O-(CF_2CF_2O)_a-(CF_2O)_b-CF_2CON-(CH_2CH_2OH)$
A weight average molecular weight = 2,000  $C_2F_4O/CF_2O = 0.7 \pm 0.2$ Examples 8 and 25

$CH_3OOC-CF_2O-(CF_2CF_2O)_a-(CF_2O)_b-CF_2-COOCH_3$
A weight average molecular weight = 2,000  $C_2F_4O/CF_2O = 0.7 \pm 0.2$ Examples 9 and 26

$HOOC-CF_2O-(CF_2CF_2O)_a-(CF_2O)_b-CF_2CH_2OH$
A weight average molecular weight = 2,000  $C_2F_4O/CF_2O = 0.7 \pm 0.2$ Examples 10 and 27

$CF_3O-[CF_2CF(CF_3)O]_a-CF_2-COCF_3$
A weight average molecular weight = 3,000

Examples 11 and 28

-continued $F-[CF(CF_3)CF_2O]_a-CF(CF_3)-COOCH_3$
A weight average molecular weight = 3,000
Examples 12 and 29
$F-[CF(CF_3)CF_2O]_a-CF(CF_3)-CONH(CH_2)_2OH$
A weight average molecular weight = 3,000

Polyfluoropolyether not having a polar group

Comparative Examples 1 and 4

$$F-(\underset{\underset{CF_3}{|}}{C}FCF_2O)_x-\underset{\underset{CF_3}{|}}{C}FCOOH$$

(Crytox 157FSH manufactured by DuPont) A weight average molecular weight = 7,000
Comparative Examples 2 and 5
$CF_3O-(CF_2CF_2O)_y-(CF_2O)_z-CF_3$
(Fonblin Z25 manufactured by Montefluos) A weight average molecular weight = 15,000
$C_2F_4O/CF_2O = 0.7 \pm 0.2$
Comparative Examples 3 and 6

$$F-(\underset{\underset{CF_3}{|}}{C}FCF_2O)_x-C_2F_5$$

(Crytox 143AY manufactured by DuPont) A weight average molecular weight = 3,000

The coefficient of friction of each of the magnetic tapes produced in Examples and Comparative Examples was measured. Further, each magnetic tape was examined on its jitter characteristics, durability and corrosion resistance.

The coefficient of friction was measured by winding the tape around a cylindrical pin having surface roughness of 0.2 s and an outer diameter of 4 mm at a winding angle of 150° and forwarding the tape at a rate of 1.4 cm/sec. under load of 21 grams. After one time and a hundred times forwarding, coefficients of friction on the magnetic and non-magnetic sides were measured at the same part of the magnetic tape.

The jitter characteristics of the magnetic tape was examined by loading the magnetic tape in a video deck, recording and reproducing video signals, reading intervals of a horizontal synchronizing signal at 15.75 KHz and measuring deviation of the intervals of said signal in one second.

The durability of the magnetic tape was examined by loading the magnetic tape in a VTR (manufactured by Hitachi), reproducing a still picture and measuring holding time of the still picture to evaluate still life. After 200 times traveling, formation of flaws on the non-magnetic side of the tape was observed. When no flaw was formed, the tape was ranked as "A", when a few flaws were formed, the tape was ranked as "B", and when many flaws were formed, the tape was ranked as "C".

The corrosion resistance of the magnetic tape was evaluated by keeping the tape at 60° C., 90 % RH and measuring the maximum magnetic flux density at predetermined intervals. The measured value was compared with the maximum magnetic flux density of the magnetic tape before keeping it under the above conditions (100 %).

The results are shown in Tables 1 and 2.

TABLE 1

| Example No. | Friction coefficient (initial) Magnetic side | Friction coefficient (initial) Non-magnetic side | Jitter (μs) | Corrosion resistance (%) | Flaws on non-magnetic side |
|---|---|---|---|---|---|
| 1 | 0.16 | 0.17 | 0.13 | 94 | A |
| 2 | 0.17 | 0.18 | 0.14 | 95 | A |
| 3 | 0.16 | 0.18 | 0.13 | 94 | A |
| 4 | 0.16 | 0.18 | 0.13 | 96 | A |
| 5 | 0.16 | 0.16 | 0.14 | 95 | A |
| 6 | 0.18 | 0.18 | 0.15 | 95 | A |
| 7 | 0.17 | 0.17 | 0.14 | 94 | A |
| 8 | 0.16 | 0.16 | 0.14 | 95 | A |
| 9 | 0.17 | 0.17 | 0.15 | 96 | A |
| 10 | 0.18 | 0.18 | 0.16 | 95 | A |
| 11 | 0.19 | 0.19 | 0.14 | 94 | A |
| 12 | 0.18 | 0.19 | 0.15 | 94 | A |
| 13 | 0.17 | 0.17 | 0.11 | 96 | A |
| 14 | 0.16 | 0.17 | 0.12 | 96 | A |
| 15 | 0.20 | 0.19 | 0.12 | 95 | A |
| 16 | 0.20 | 0.19 | 0.13 | 94 | A |
| 17 | 0.19 | 0.17 | 0.12 | 94 | A |
| Comp. 1 | 0.19 | 0.19 | 0.16 | 91 | A |
| Comp. 2 | 0.20 | 0.21 | 0.19 | 89 | B |
| Comp. 3 | 0.21 | 0.21 | 0.19 | 90 | B |
| Comp. 7 | 0.40 | 0.25 | 0.40 | 84 | C |

TABLE 2

| Example No. | Friction coefficient of magnetic side Initial | Friction coefficient of magnetic side After 100 times | Friction coefficient of non-magnetic side Initial | Friction coefficient of non-magnetic side After 100 times | Jitter (μs) | Still life (min.) |
|---|---|---|---|---|---|---|
| 18 | 0.12 | 0.13 | 0.13 | 0.14 | 0.12 | 71 |
| 19 | 0.11 | 0.12 | 0.12 | 0.14 | 0.14 | 73 |
| 20 | 0.12 | 0.12 | 0.12 | 0.13 | 0.13 | 73 |
| 21 | 0.11 | 0.13 | 0.14 | 0.14 | 0.13 | 72 |
| 22 | 0.13 | 0.12 | 0.14 | 0.14 | 0.10 | 80 |
| 23 | 0.13 | 0.14 | 0.14 | 0.15 | 0.14 | 69 |
| 24 | 0.13 | 0.13 | 0.13 | 0.15 | 0.14 | 70 |
| 25 | 0.14 | 0.14 | 0.14 | 0.16 | 0.12 | 70 |
| 26 | 0.14 | 0.15 | 0.14 | 0.17 | 0.16 | 65 |
| 27 | 0.17 | 0.17 | 0.15 | 0.16 | 0.16 | 60 |
| 28 | 0.17 | 0.18 | 0.16 | 0.18 | 0.15 | 60 |
| 29 | 0.13 | 0.16 | 0.13 | 0.16 | 0.15 | 60 |
| 30 | 0.12 | 0.13 | 0.14 | 0.14 | 0.11 | 90 |
| 31 | 0.12 | 0.12 | 0.13 | 0.13 | 0.12 | 72 |
| 32 | 0.13 | 0.13 | 0.14 | 0.15 | 0.11 | 70 |
| 33 | 0.13 | 0.13 | 0.13 | 0.14 | 0.12 | 70 |
| 34 | 0.12 | 0.12 | 0.13 | 0.13 | 0.10 | 72 |
| Comp. 4 | 0.17 | 0.19 | 0.15 | 0.19 | 0.17 | 50 |
| Comp. 5 | 0.18 | 0.23 | 0.19 | 0.23 | 0.19 | 25 |
| Comp. 6 | 0.18 | 0.24 | 0.19 | 0.23 | 0.19 | 20 |

TABLE 2-continued

| Example No. | Friction coefficient of magnetic side Initial | Friction coefficient of magnetic side After 100 times | Friction coefficient of non-magnetic side Initial | Friction coefficient of non-magnetic side After 100 times | Jitter (μs) | Still life (min.) |
|---|---|---|---|---|---|---|
| Comp. 8 | 0.30 | 0.38 | 0.29 | 0.31 | 0.38 | 5 |

As is clear from the results in Tables 1 and 2, the magnetic tapes of the present invention produced in Examples 1 to 34 have smaller coefficients of friction and jitter, better corrosion resistance and longer still life than those produced in Comparative Examples, and no flaw was formed on the non-magnetic side of the magnetic tapes of the present invention.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, a magnetic layer formed on one surface of said substrate and a back coating layer having a thickness of from 0.1 to 3.0 μm formed on the other surface of said substrate, wherein said back coating layer contains at least one polyfluoropolyether selected from the group consisting of a fluorinated polyether which comprises repeating units of the formula:

$$-(C_mF_{2m}O)- \qquad (I)$$

wherein m is an integer of 1 to 18 and has, at least one molecular end, a polar group selected form the group consisting of polar groups of the formulae:

$$-COOR \qquad (II)$$

$$-CONR_1R_2 \qquad (III)$$

$$-C_nH_{2n}OH \qquad (IV)$$

$$-C_nH_{2n}NR_1R_2 \qquad (V)$$

$$-COC_nF_{2n+1} \qquad (VI)$$

$$-C(OH)_2C_nF_{2n+1} \qquad (VII)$$

and $$-CH_2OPO(OH)_2 \qquad (VIII)$$

wherein R is a $C_1$-$C_6$ alkyl group or a benzyl or phenethyl group, $R_1$ and $R_2$ are the same and different, and each a hydrogen atom, a $C_1$-$C_6$ alkyl group, a benzyl or phenethyl group or a group of the formula: —$R_3OH$ wherein $R_3$ is a $C_2$-$C_6$ alkyl group, and n is an integer of 1 to 10 and a fluorinated polyether which comprises the repeating units of the formula (I) and has, at both molecular ends, polar groups of the formula:

$$-COO-(CH_2CH_2O)_l-PO(OH)_2 \qquad (IX)$$

wherein l is an integer of 1 to 90, said polyfluoropolyether being contained in the back coating layer in an amount of from 0.01 to 10.0% by weight based on the total weight of solid components in the back coating layer.

2. The magnetic recording medium according to claim 1, wherein the polyfluoropolyether is at least one selected from the group consisting of compounds of the formulae:

(1) $HO-(CH_2)_2-NHCO-CF_2O-(CF_2CF_2O)_a-(CF_2O)_b-CF_2-CONH-(CH_2)_2-OH$, (2) $(HOCH_2CH_2)_2-NCO-CF_2O-(CF_2CF_2O)_a-(CF_2O)_b-CF_2CON-(CH_2CH_2OH)$, (3) $CH_3OOC-CF_2O-(CF_2CF_2O)_a-(CF_2O)_b-CF_2-COOCH_3$, (3) $HOCH_2-CF_2O-(CF_2CF_2O)_a-(CF_2O)_b-CF_2-CH_2OH$, (4) $CF_3O-[CF_2CF(CF_3)O]_b-CF_2-COCF_3$, (5) $F-[CF(CF_3)CF_2O]_b-CF(CF_3)-COOCH_3$, (6) $F-[CF(CF_3)CF_2O]_b-CF(CF_3)-CONH(CH_2)_2OH$, (7) $CF_3-(OCF_2CF_2)_c-(OCF_2)_d-CF_2CH_2-OPO(OH)_2$, $$(HO)_2\overset{O}{\overset{\|}{P}}OCH_2-CF_2O-(CF_2CF_2O)_c-(CF_2O)_d-CF_2CH_2O\overset{O}{\overset{\|}{P}}(OH)_2, \qquad (8)$$

$$(HO)_2\overset{O}{\overset{\|}{P}}OCH_2[CF(CF_3)CF_2O]_e-CF_2CF_2-CH_2O\overset{O}{\overset{\|}{P}}(OH)_2, \qquad (9)$$

$$(HO)_2\overset{O}{\overset{\|}{P}}-(OCH_2CH_2)_f-OOC-CF_2O-(CF_2CF_2O)_c-(CF_2O)_d-CF_2COO-(CH_2CH_2O)_g-\overset{O}{\overset{\|}{P}}(OH)_2 \qquad (10)$$

and $$(HO)_2\overset{O}{\overset{\|}{P}}-(OCH_2CH_2)_f-OOC-[CF(CF_3)CF_2O]_e-COO-(CH_2CH_2O)_g-\overset{O}{\overset{\|}{P}}(OH)_2 \qquad (11)$$

wherein a and b are the same or different and each an integer of 10 to 120, c, d and e are the same or different and each an integer of 10 to 50, and f and g are the same or different and each an integer of 1 to 50.

3. The magnetic recording medium according to claim 1, wherein the amount of said polyfluoropolyether is from about 0.1 to 4.0% by weight based on the total weight of solid components in the back coating layer.

4. The magnetic recording medium according to claim 1, wherein the back coating layer further contains at least one fluorine-containing solid lubricant selected from the group consisting of compounds of the formulae:

$$C_pF_{2p+1}(CH_2)_qOOC(CH_3)=CH_2 \qquad (X)$$

$$C_pF_{2p+1}(CH_2)_qOOCCH=CH_2 \quad (XI)$$

$$C_pF_{2p}SO_2N(C_3H_7)C_2H_4OPO(OH)_2 \quad (XII)$$

$$C_pF_{2p+1}COOH \quad (XIII)$$

$$C_pF_{2p+1}(CH_2CH_2O)_rCOOH \quad (XIV)$$

$$C_pF_{2p+1}CH_2CH_2OH \quad (XV)$$

wherein p is an integer of 1 to 40, q is an integer of 1 to 50 and r is an integer of 1 to 50.

5. The magnetic recording medium according to claim 5, wherein weight ratio of the polyfluoropolyether to the fluorine-containing solid lubricant is from 1:10 to 10:1.

6. The magnetic recording medium according to claim 4, wherein the total amount of the polyfluoropolyether and the fluorine-containing solid lubricant is from 0.05 to 10.0% by weight based on the total weight of the solid components in the back coating layer.

7. The magnetic recording medium according to claim 6, wherein said total amount is from 1.0 to 5.0% by weight based on the total weight of solid components in the back coating layer.

* * * * *